United States Patent
Shiota et al.

(10) Patent No.: US 6,657,753 B2
(45) Date of Patent: Dec. 2, 2003

(54) PICTURE IMAGE OUTPUTTING METHOD AND PHOTOGRAPH FINISHING SYSTEM USING THE METHOD

(75) Inventors: Kazuo Shiota, Tokyo (JP); Shuichi Ohtsuka, Kanagawa-ken (JP); Nobuyoshi Nakajima, Kanagawa-ken (JP); Norihisa Haneda, Saitama-ken (JP); Sugio Makishima, Saitama-ken (JP); Hiroshi Tanaka, Saitama-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/038,821

(22) Filed: Jan. 8, 2002

(65) Prior Publication Data

US 2002/0057460 A1 May 16, 2002

Related U.S. Application Data

(63) Continuation of application No. 08/974,888, filed on Nov. 20, 1997, now Pat. No. 6,346,998.

(30) Foreign Application Priority Data

Nov. 20, 1996 (JP) .............................. 8-309322
Nov. 20, 1996 (JP) .............................. 8-309323
Jun. 18, 1997 (JP) .............................. 9-161660
Jun. 18, 1997 (JP) .............................. 9-161661

(51) Int. Cl.$^7$ ............................................. G06F 15/00
(52) U.S. Cl. ...................... 358/487; 358/1.15; 358/506
(58) Field of Search ................ 358/1.1, 1.5, 1.12, 358/1.13, 1.14, 1.15, 1.16, 1.17, 1.18, 474, 487, 506

(56) References Cited

U.S. PATENT DOCUMENTS 4,947,266 A    8/1990   Watanabe et al.
5,134,573 A    7/1992   Goodwin
5,377,016 A    12/1994  Kashiwagi et al.
5,461,492 A    10/1995  Jones
5,574,533 A    11/1996  Itoh
5,608,542 A  * 3/1997   Krahe et al. ................ 358/449
5,784,149 A    7/1998   Kawaoka (List continued on next page.)

FOREIGN PATENT DOCUMENTS

EP    0234809 A2    9/1987
EP    0 726 672 A2  8/1996
EP    0774710 A1    5/1997
JP    08101464      4/1996

*Primary Examiner*—Mark Wallerson
(74) *Attorney, Agent, or Firm*—Birch, Stewart, Kolasch & Birch, LLP

(57) ABSTRACT

A plurality of picture image data obtained from a film in one film handling operation by a film scanner with the automatic film feeding function are output as prints by a digital printer and also as files in a recording medium by a file outputting device. In the system for providing the above two kinds of output services, the numbers of film scanners, file outputting devices, and digital printers are determined so that the processing performance of each kind of apparatus in a unit time times the number of each kind of apparatus is almost the same, to make each kind of apparatus comprising the system demonstrate its full performance. A medium image obtaining device for obtaining an image file recorded in a medium and a digital camera image obtaining device may further be provided so that the above two outputting services are promptly provided for a picture image such as a processed image recorded in a medium and brought into a service provider by a customer and a picture image recorded by a digital camera, whereby one system can carry out film reading, image obtaining from a medium or a digital camera, picture print generation, and writing a picture image in a recording medium.

16 Claims, 8 Drawing Sheets

U.S. PATENT DOCUMENTS

| | | |
|---|---|---|
| 5,786,823 A | 7/1998 | Madden et al. |
| 5,801,852 A | 9/1998 | Truc et al. |
| 6,016,184 A | 1/2000 | Haneda |
| 6,226,071 B1 * | 5/2001 | Ishii et al. .................... 355/40 |
| 6,384,939 B1 * | 5/2002 | Honda et al. ............... 358/474 |

* cited by examiner

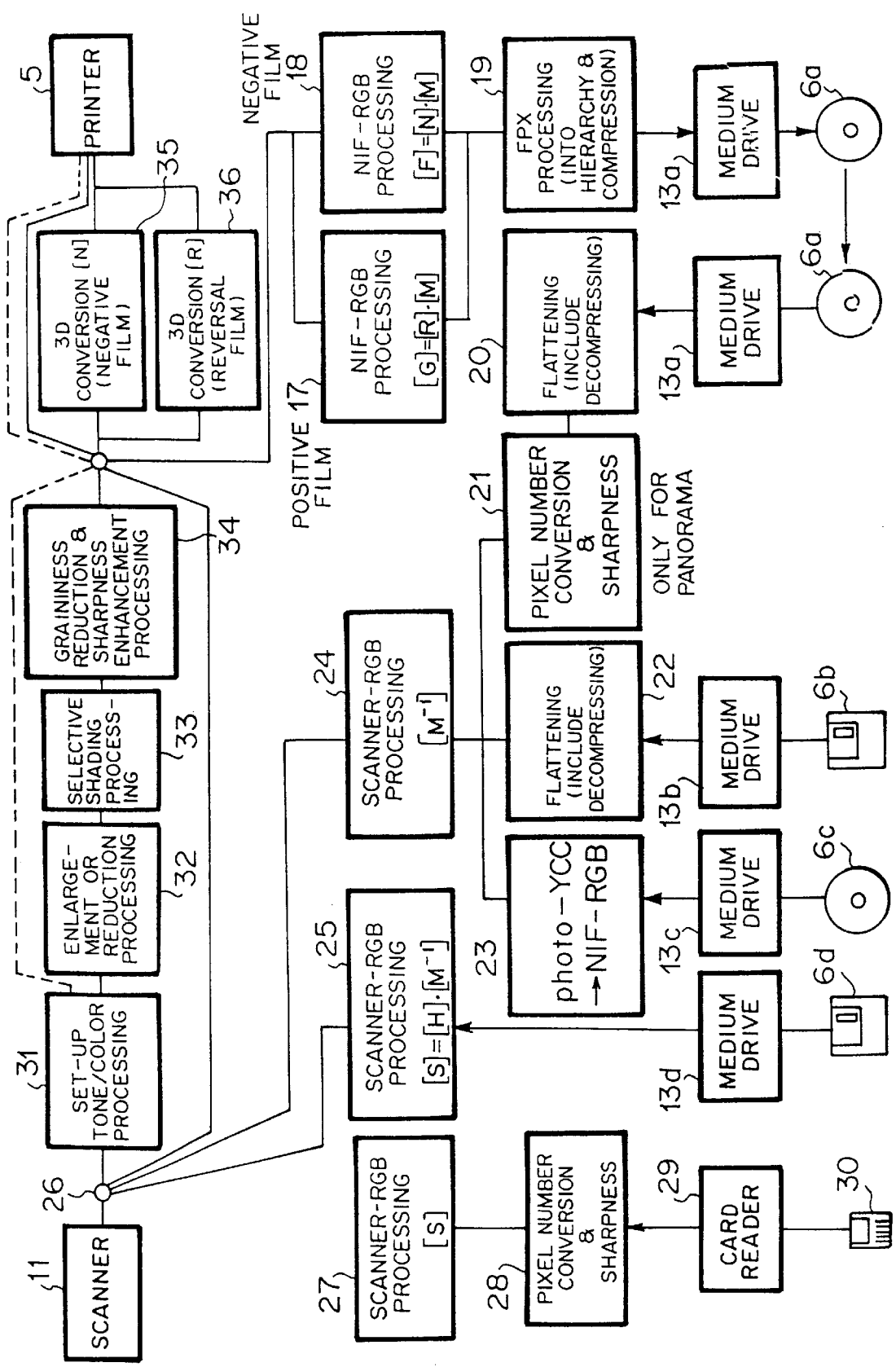

PICTURE IMAGE OUTPUTTING METHOD AND PHOTOGRAPH FINISHING SYSTEM USING THE METHOD

This application is a continuation of application Ser. No. 08/974,888, filed on Nov. 20, 1997 now U.S. Pat. No. 6,346,998, the entire contents of which are hereby incorporated by reference and for which priority is claimed under 35 U.S.C. §120; and this application claims priority of Application No(s). 8-309322 filed in Japan on Nov. 20, 1996; 8-309323 filed in Japan on Nov. 20, 1996; 9-161660 filed in Japan on Jun. 18, 1997 and 9-161661 filed in Japan on Jun. 18, 1997 under 35 U.S.C. §119.

BACKGROUND OF THE INVENTION

1. Field of the Invention

The present invention relates to a photograph finishing system and method for providing digital picture services to read a picture image recorded on a film and output it as both a print and an image file in a recording medium.

2. Description of the Related Art

A photograph finishing system has been known which obtains image data by reading a picture recorded in each frame of a photograph film (hereinafter simply called a film) using a film scanner and outputs the image data as a picture print after necessary image processing has been carried out on the image.

Meanwhile, picture image data have been stored in a removable medium as an image file so that the picture image data can be used by a personal computer or the like. This service has been generally carried out on only picture images selected by a customer. Therefore, it has been normal for equipment such as a scanner or an image processing apparatus to be installed separately from the photograph finishing system such as described above. In this case, for providing such a high quality image file that they can be output not only as an image on a monitor but also as a picture print, costly equipment is necessary as the equipment described above. Therefore, a file outputting service charge has not necessarily been inexpensive.

Recently, digital cameras have become wide spread, because of their advantage that the pictures recorded thereby can be easily input to a personal computer. Following the spread of digital cameras, a printing service to output pictures recorded by a digital camera as picture prints has become popular.

However, such a service has fewer users than the printing service using a film or a medium. Furthermore, the number of pixels of a digital image obtained by a digital camera or image processing that a digital camera carries out on the digital image varies depending on the type of a digital camera, which is different from the case where a picture recorded on a film is digitized. Therefore, to print such a digital image, more sophisticated processing must be carried out, which leads to an increase in equipment cost. As a result, in reality, only a portion of service providers have installed an image processing apparatus or a picture printer dedicated to outputting prints of pictures recorded by a digital camera separately from a conventional photograph finishing system.

SUMMARY OF THE INVENTION

A demand for a file outputting service to a removable medium as described above has also been increasing recently, following a sharp increase in the popularity of personal computers. Furthermore, a service wherein all customers' pictures are stored in a server computer having a large capacity disc and installed in a laboratory or the like (hereinafter called an image server) and used for extra prints of the stored pictures has been proposed. Therefore, a method which can output a picture image data file at a lower cost and more efficiently has been desired.

When considered from the point of view of picture quality, it is not preferable to carry out print output and file output separately. When they are carried out separately, it is not necessarily guaranteed that reading conditions or image processing conditions are the same between the output print and file. Therefore, if a print is generated from a picture image file for example, it may not necessarily have the same finish as a simultaneous produced print, and an inconvenience such as an adjustment by trial and error to achieve the same finish may occur.

The present invention therefore provides a picture image outputting method and system whereby an image file by which the finish a customer expects is obtained and output efficiently and provided to the customer at a low cost, when a picture image recorded on a film is output as a print and recorded in a recording medium as an image file.

In other words, a plurality of picture image data obtained in one film handling operation are output as prints by a printer while they are output as files in a predetermined recording medium. In this manner, equipment such as a film scanner can be used efficiently, and print generation and file saving are efficiently carried out at a low cost.

In this case, outputting of both a print and a file is carried out in one film handling operation, which means that image processing is carried out based on only one and the same criterion, if necessary. Therefore, when a picture image data having been recorded in a file are output as a print, the expected finish can be obtained without any adjustment by trial and error.

The processing speed of a medium drive such as a floppy disc drive and that of a printer are not necessarily the same. Therefore, in the above system, even when output of both a print and a file is carried out at the same time, it is possible that the medium having the faster processing speed will be put in an idle state. Likewise, the processing speed is not necessarily balanced between a film scanner and the above two kinds of outputting apparatuses. In other words, the processing ability of the entire system depends on the apparatus with the lowest processing speed among the three kinds of apparatuses. Therefore, no matter how high the performance of the apparatuses other than the lowest one is, its ability may be wasted when incorporated in the above system.

In the present invention, to provide a low cost service without such a waste, each apparatus configuring the system can demonstrate its ability fully.

For this purpose, the numbers of film scanners, printers, and file outputting apparatuses are decided so that the processing ability of a single apparatus x the number of apparatus is almost the same for each kind of apparatus.

Furthermore, if the chances for outputting picture images to a medium are increased by the above high efficiency system, it is expected that orders of prints from the medium will also increase in proportion. Especially, image editing and processing software for a personal computer is becoming more reasonable in price and easier to use recently. Therefore, print orders of processed images are also expected to increase.

Moreover, following future progress in technology, if the price of a digital camera becomes as reasonable as the price of a camera using a film, it is expected that a digital camera will be used as frequently as a camera using a film.

Therefore, the present invention adds medium image obtaining means for taking in an image recorded in a medium and digital camera image obtaining means to the above photograph finishing system so that a print order of a picture image recorded in a medium and brought in to a service provider, or a print order of a picture recorded by a digital camera can be processed promptly without an additional equipment cost.

In this manner, during the time when there is no picture image to read from a film, a digital image taken in from a medium or a digital camera is processed, for example, and the operation rate of the system is improved. Furthermore, by concentrating functions in one system, it becomes possible to share the function for common processing such as image processing, which leads to a reduction in cost and a reduced space for installation.

In other words, the present invention can provide low cost outputting services of a print and a file of images read from a film and furthermore obtained from a medium or a digital camera using one photograph finishing system. In this manner, even a small scale service provider can introduce this system without the problems regarding cost and installation space, and thus service providing locations can expand.

BRIEF DESCRIPTION OF THE DRAWINGS

FIG. 11 is a diagram showing a configuration of the system shown in FIG. 10.

DESCRIPTION OF THE PREFERRED EMBODIMENTS

Figure 1:
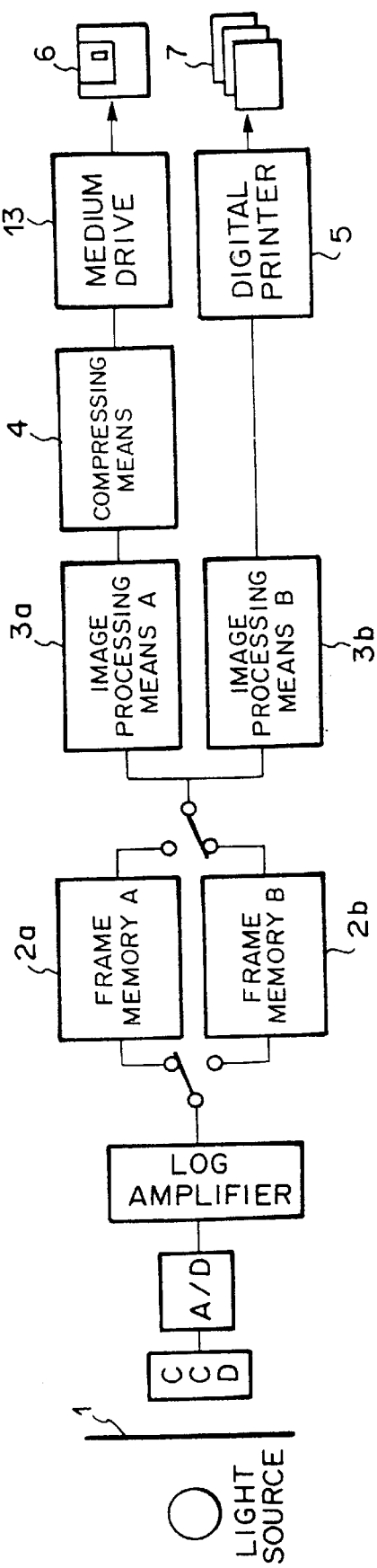
FIG. 1 is a diagram showing an embodiment of a picture image outputting apparatus according to the present invention.

The picture image outputting method of the present invention is characterized by that a plurality of picture image data are obtained by sequentially reading a plurality of picture images recorded in frames of a developed film using a film scanner having the function of automatic film feeding, and the plurality of picture images are output by a printer in the form of prints and files in a predetermined recording medium. In other words, the present invention outputs the picture image data in the form of both prints and files at one time.

It is preferable that the reading is carried out on only images of desired frames among the plurality of picture frames recorded on the photograph film. The "desired frame" herein referred to means the frames with normal quality, without blur, and without overexposure or underexposure, for example. In the APS (Advanced Photo System) or the like, it is possible for a photographer to decide whether or not a frame should be printed, and records the information on a film magnetically, before the film is read. Some photograph finishing systems therefore have the function of reading this information using a film scanner and automatically skipping unnecessary frames. In other words, in such a case, "the desired frames" mean the frames on which information showing necessity of print output is recorded.

As a concrete example of the above method, several methods can be listed such as the method wherein image data obtained at one film reading are output in the form of prints and files simultaneously or alternately, or the method wherein a first reading is carried out in forward film feeding direction and the image data having been read are all output in the form of prints, and a second reading is carried out in the reverse film feeding direction and the image data having been read at the second reading are then output in the form of files (obviously, the file output may come before the print output).

As a general method for reading a film, it has been known that a pre-scan for determining a reading condition or the like is carried out first and a fine scan for obtaining image data at the desired resolution is then carried out. The one in the "one film reading" in the above means film reading at one time to obtain image data at the desired resolution, and a pre-scan is not included in the number of readings.

When image processing is carried out on image data before outputting a print or a file, it is preferable that different image processing is carried out depending on the picture quality required by the picture image to be output in each form.

The picture image outputting apparatus of the present invention is an apparatus which carries out the output processing according to the above method, comprising a film scanner for sequentially reading a plurality of picture images recorded in frames of a developed photograph film by automatically feeding the film, a printer which outputs the plurality of image data in the form of picture prints, and file outputting means for outputting files of the image data in a predetermined recording medium while the printer is outputting the plurality of image data, by operating in parallel to the printer.

In this apparatus, when different image processing is carried out before outputting a print or a file, two forms of image processing means may be installed so that each means respectively carries out the processing for outputting a print or a file. Alternatively, one form of image processing means which can adjust processing conditions by changing a parameter or the like may be installed so that the image processing is carried out by changing the parameter for a print output or for a file output upon necessity.

The picture image outputting method and apparatus of the present invention are aimed at the case where a large amount of films should be processed promptly by using the automatic film feeding function, such as the case for the photograph finishing system installed in a laboratory. In other words, a system wherein picture image data are sequentially output in the order of reading while the reading of subsequent data is continuing is assumed herein, different from the configuration wherein a scanner and a printer are connected to a personal computer, for example, and image data in a frame are output as a file and then as a print after a film is manually set in a scanner and then read while its frames are being selected. In other words, as a system configuration, a configuration wherein image data having been read are written in two frame memories alternately while image data are read and output from the frame memory wherein writing is not carried out is assumed herein, such as the configuration of a conventional automatic printer for a laboratory.

When the above apparatus is used as a photograph finishing system, it is preferable that the system comprises a predetermined number of film scanners for reading a film brought in by a customer for placing an order, recording means for recording the picture image data read by the film scanner, a predetermined number of file outputting apparatuses for recording the picture image data having been temporarily recorded in the recording means in a predetermined recording medium as an image file for each order, and a predetermined number of printers for outputting the picture image data having been recorded in the recording means as a print, wherein the number of file outputting apparatuses and printers are such numbers that the apparatuses and printers can deal with, in a unit time, almost the same number of orders as all film scanners can deal with in the same unit time when they are constantly used.

The reason why the numbers of file outputting apparatuses and the printers are "such numbers that the apparatuses and printers can deal with, in a unit time, almost the same number of orders as all film scanners can deal with in the same unit time when they are constantly used" is that the processing speed is balanced as a whole by increasing the number of apparatus whose processing speed is low.

However, "the unit time" herein referred to means a comparatively long time, such as an hour or a day. Therefore, when the processing by the above system is viewed over a short time (for example, a few minutes), a temporary processing queue may occur between inputting and outputting apparatuses. For example, a file outputting apparatus such as a floppy disc drive generally has slower processing speed than a film scanner. Therefore, if picture image data read by one film scanner are output by one file outputting apparatus, a processing queue occurs. At this time, since one recording medium should be assigned to one order upon outputting a file, it is impossible to distribute the processing to the plurality of file outputting apparatuses. Therefore, when the processing for only one order is viewed, a processing queue occurs between the inputting or outputting apparatuses.

The above "recording means" is used for avoiding such a waste due to a processing queue. In other words, picture image data read by the film scanner are temporarily stored in the recording means regardless of the processing state of the file outputting apparatuses, and subsequent reading is carried out. In this manner, the file outputting apparatuses can read the picture image data having been stored in the recording means sequentially and carry out the outputting processing without making the film scanners wait for the completion of the output processing. Since the output processing of the film subsequently processed by the scanner is carried out by another file outputting apparatus, the processing by the entire system will never be delayed.

Therefore, the above recording means will be sufficient if the means has such a capacity and processing speed that the above object can be achieved. For example, a memory (a buffer) in a predetermined size may be set for each outputting apparatus and used in a cyclic manner. Alternatively, apart from the output to the printer or a removable medium, if the picture image data having been read are stored in a large capacity disc, the disc may be used as the recording means. Switching of the inputting and outputting apparatuses can be carried out by a generally known input output switching method.

As an embodiment of the above photograph finishing system, an embodiment is also possible which comprises film image obtaining means for obtaining a digital image by reading a developed film, print outputting means for outputting the digital image obtained by the film image obtaining means in the form of a print, and outputting means to a medium for recording the digital image in a predetermined recording medium, and further comprises medium image obtaining means for obtaining digital image recorded in a predetermined recording medium, and interrupting means for interruptively inputting the digital image obtained by the medium image obtaining means into the print outputting means, wherein the print outputting means outputs a picture print of the digital image which has been input interruptively when the interruptive input is carried out by the interrupting means.

The interrupting means may be a known input switching function, and it can be either physical switching using hardware or logical switching using software. The interruption by the interrupting means can be carried out by an operator's instruction or by automatically generating an interruption signal after detecting a medium set in the medium image obtaining means.

The medium image obtaining means are mainly a medium disc drive such as an MO disc drive or a Zip disc drive. In addition to such a medium disc drive, the means includes communication equipment (a modem or a TA, and communication software or the like) for obtaining digital image data transferred from a hard disc of a customer's personal computer via a network. In other words, the recording medium include not only a removable medium but also a hard disc or the like installed in a personal computer.

It is preferable to carry out appropriate image processing upon necessity on the digital image data obtained by the film image obtaining means or the medium image obtaining means. More specifically, when such a digital image is printed out, it is preferable to carry out image processing in accordance with the characteristics of the printer, while it is preferable to carry out image processing preferable for a display on a CRT when the digital image is recorded in a medium.

In other words, the meaning of "outputting the digital image obtained by the film image obtaining means in the form of a print" or "interruptively inputting the digital image obtained by the medium image obtaining means into the print outputting means" is not necessarily limited to outputting or interruptively inputting the obtained image data as they are. It means that data representing the same image as the obtained digital image are output or interruptively input.

The data representing the same image as the obtained digital image are the data after necessary image processing has been carried out on the obtained digital image. The image processed data of the same digital image may be separately stored and substituted with the data before the processing.

In U.S. patent application Ser. No. 08/970,427 for example, a system in which a customer orders a print referring to a picture image at low resolution (the resolution which cannot be used for a print but is sufficient for display on a CRT) and the actual printing is carried out using separately stored high resolution image data of the picture image, has been disclosed. The photograph finishing system of the present invention may further comprise a recording medium for storing high resolution data of the digital image so that the medium image obtaining means obtains low resolution digital image or information indicating the low resolution image recorded in the predetermined medium and searches the recording medium for high resolution data corresponding to the low resolution digital image to interruptively input the obtained high resolution data to the print outputting means.

As still another embodiment, the photograph finishing system is also possible which comprises film image obtaining means for obtaining a digital image by reading a developed film and print outputting means for outputting the digital image obtained by the film image obtaining means in the form of a picture print, and further comprises digital camera image obtaining means for obtaining a digital image recorded by a digital camera and interrupting means for interruptively inputting the digital image obtained by the digital camera image obtaining means to the print outputting means, wherein the print outputting means outputs the digital image interruptively input by the interrupting means in the form of a picture print when an interruptive input by the interrupting means occurs.

The digital camera image obtaining means refers to, for example, a card reader for reading a memory card used in a digital camera such as SSFDC, a Compact Flash, or PCMCIA, a cable connection interface for transferring data by directly connecting a built-in memory of a digital camera with the digital image obtaining means, and software for carrying out a variety of processing necessary for outputting the digital image obtained by the card reader and the cable connection interface in the form of a print.

The variety of processing means the processing for converting a digital image recorded by a digital camera into data treatable by the photograph finishing system, and this processing is carried out on only the digital image obtained by a digital camera. For example, the size and the aspect ratio of a digital image obtained by a digital camera vary depending on the type of a digital camera. Therefore, pixel density converting processing should be carried out in accordance with the size of rolled paper on which the image is printed. Furthermore, a digital image obtained by an inexpensive digital camera has less pixels than a digital image read from a film, and becomes blurred when it is printed as it is. Therefore, sharpness processing or the like is necessary for such a digital image. However, some expensive digital cameras can obtain a digital image with sufficient pixel numbers, and such a conversion processing is not indispensable in the present invention.

It is preferable that image processing such as color tone processing, enlargement or reduction processing in accordance with the size of a print, or selective shading processing is carried out on the digital image obtained by reading a film or from a digital camera upon necessity.

The above photograph finishing system may further comprise outputting means to a medium for recording a digital image obtained by the film image obtaining means or by the digital camera image obtaining means in a predetermined recording medium. In this manner, any digital input output service can be carried out by a single system.

DESCRIPTION OF THE PREFERRED EMBODIMENTS

Hereinafter, each of the above forms will be explained referring to the accompanying drawings. FIG. 1 shows a first embodiment of the present invention. This is a photograph finishing system installed in a laboratory or the like, and having the function of outputting picture image data which have been output as a first print, to a removable medium or to an image server in a laboratory.

The system reads all normal quality pictures recorded on film 1 except for the pictures with blur or extreme overexposure or underexposure, as does a conventional photograph finishing system. The digital image data obtained as described above are stored in a frame memory 2. Alternatively, if the system reads pictures recorded on an APS film, only frames having information showing necessity of printing may be read based on the information magnetically recorded on the film as described above.

The reading is carried out by scanning each frame twice, with the first being a pre-scan and the second being a fine scan. The pre-scan is carried out to find an optimal reading condition, while image data obtained by the fine scan is used for the output of the image data.

Figure 3:
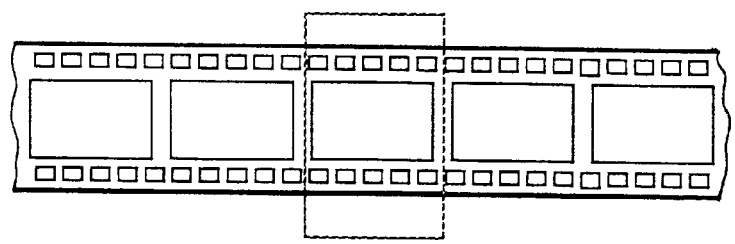
FIG. 3 is a diagram showing an example of a film feeding sequence.
Figure 4:
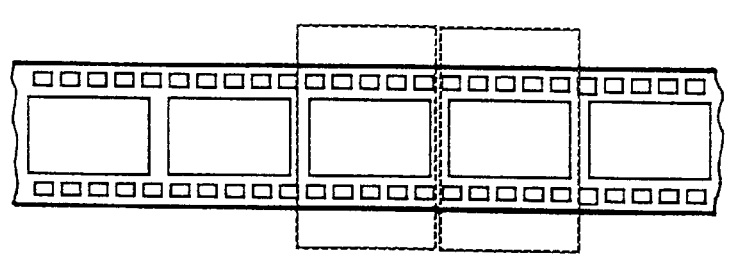
FIG. 4 is a diagram showing another example of a film feeding sequence.
Figure 5:
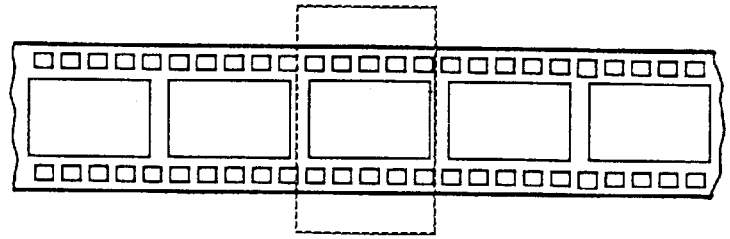
FIG. 5 is a diagram showing still another example of a film feeding sequence.

On this occasion, as shown in FIG. 3, the film may be fed by one frame after the pre-scan and the fine scan is carried out on each frame. However, as shown in FIG. 4, if the pre-scan and the fine scan are carried out in parallel at different positions, the reading can be carried out for only approximately half the time necessary for the method shown in FIG. 3. Alternatively, as shown in FIG. 5, only the pre-scan may be carried out for all frames by feeding the film in one direction, and the fine scan is then carried out by feeding the film in the reverse direction.

The image data read as described above are stored in two frame memories 2a and 2b alternately so that the reading processing and the output processing are carried out in parallel in such a manner that image data having been read are written in one frame memory, while image data having been stored in the other frame memory are output.

The image data taken out from the frame memory 2 for an output of the image data are processed by two image processing means 3a and 3b respectively. On this occasion, the processing carried out by the two image processing means and the subsequent output processing is carried out for each image data simultaneously (in parallel). After both processing operations have been completed, the frame memories are switched and the subsequent image reading is carried out by the two image processing means.

The image processing carried out by both image processing means 3a and 3b is the correction of color or tone, for example. However, the processing by these two image processing means is different depending on the object of the image data to be output. For example, the image processing means 3b carries out the processing for enhancing the quality of the image data for the output of the image data on photographic paper, while the image processing means 3a carries out the image processing for making the image data easy to see on a display of a personal computer. However, even though they carry out different processing, it is possible to correlate the processing carried out by the image processing means 3a with the processing carried out by the image processing means 3b, which is different from the case where the image processing is carried out respectively by two separate apparatuses. Therefore, when the file of the image is output later as a print, the image processing to be carried out is determined explicitly, based on the correlation.

The image data processed by the image processing means 3a are compressed by compressing means 4 and recorded as a compressed image file in a recording medium 6 by a medium drive 13. Meanwhile, the image data processed by the image processing means 3b are output as a print by a digital printer 5.

Figure 2:
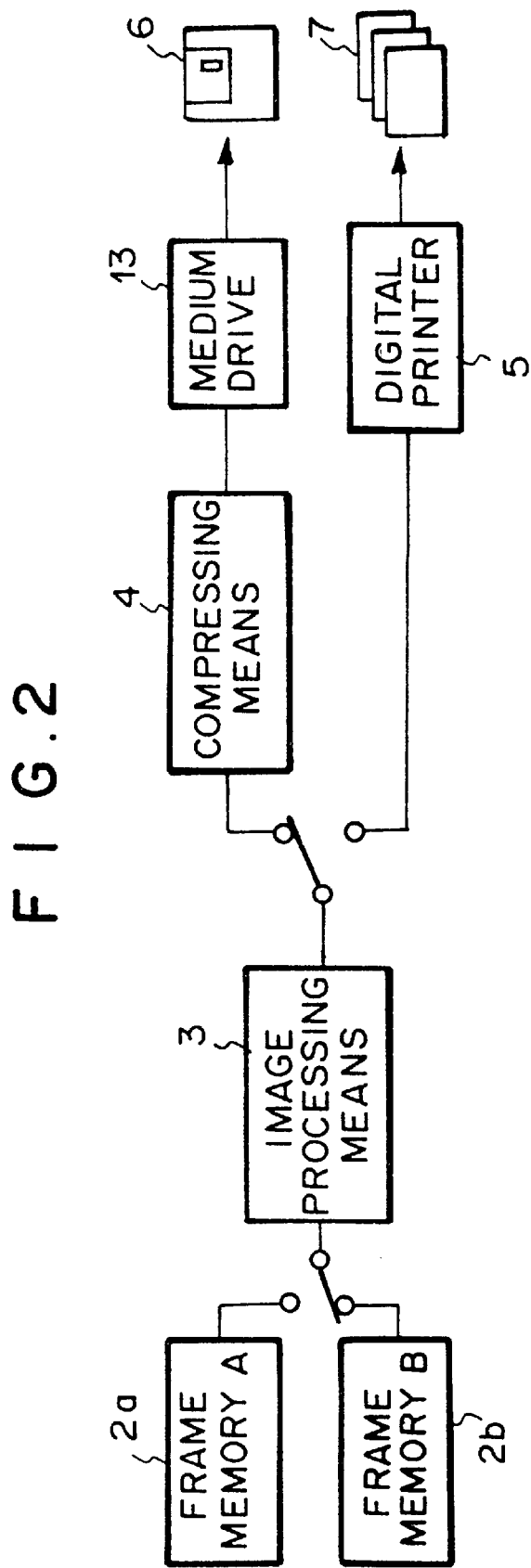
FIG. 2 is a diagram showing another embodiment of a picture image outputting apparatus according to the present invention.

The embodiment described above carries out the print output and the file output for each image data together. Another embodiment which carries out the file output and the print output alternately will be described referring to FIG. 2. The aspect of the reading of a film in the embodiment shown in FIG. 2 is the same as the embodiment shown in FIG. 1. Therefore, the explanation and the illustration of the reading are omitted.

The embodiment shown in FIG. 1 comprises image processing means 3 respectively for file output and for print output. The embodiment shown in FIG. 2 has only one image processing means, and the image processing means carries out the image processing for outputting a file when a processing path is switched to the compressing means 4, while the image processing means carries out the processing for outputting a print when the processing path is switched to the digital printer 5.

In the embodiment shown in FIG. 2, file output and print output may be carried out alternately for each image data. Alternatively, after all frames of image data read by feeding a film in one direction have been output as files, the processing path may be switched and the image data are output as prints by reading each frame again while feeding the film in the reverse direction.

When the present invention is carried out, whether the embodiment 1 or 2 is adopted may be decided based on the performance of the film scanner and the digital printer. For example, if the reading by the scanner is time consuming, it is highly likely that a queue will occur in the outputting processing. Therefore, it will be sufficient to output a file and a print alternately by switching the processing path, without having two image processing means. In other words, it is preferable to adopt the embodiment wherein the activity ratio of each equipment becomes the largest.

Figure 6:
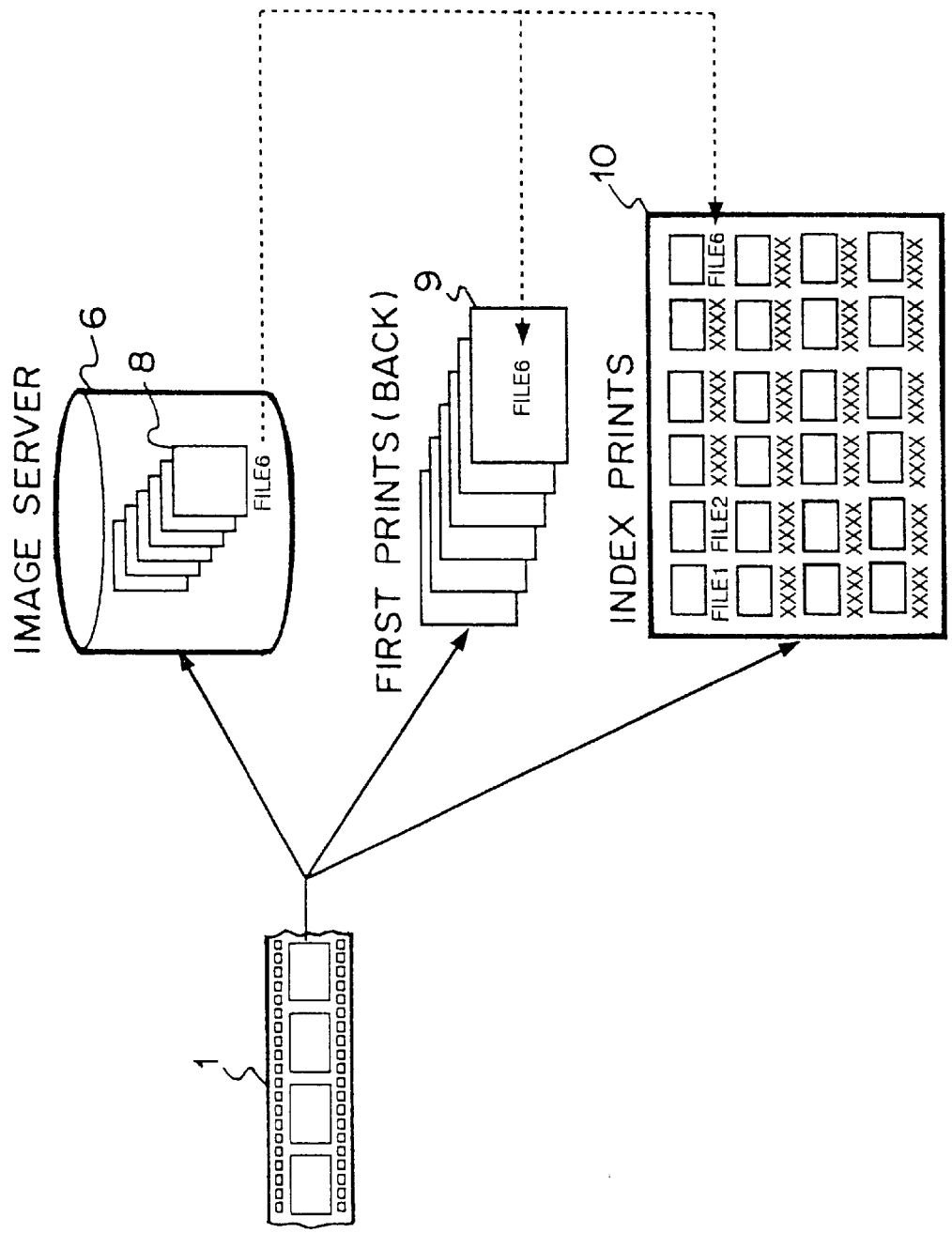
FIG. 6 is a diagram showing an example of file name recording on a print.

When a file and a print are output by the picture image outputting method and apparatus of present invention, it is preferable that the name of an image file is recorded on the back of a first print 9 or under each frame of index prints 10, as shown in FIG. 6. In this manner, when an extra print is ordered, for example, it becomes easier to search for an image file 8 stored in an image server 6 in a laboratory, and a prompt service can therefore be provided.

If the apparatus described above is installed in a laboratory or the like instead of a conventional photograph finishing system, not only the print output but also the file output can be carried out at almost the same cost as conventional printing, and a more inexpensive service can be provided to a customer.

Figure 7:
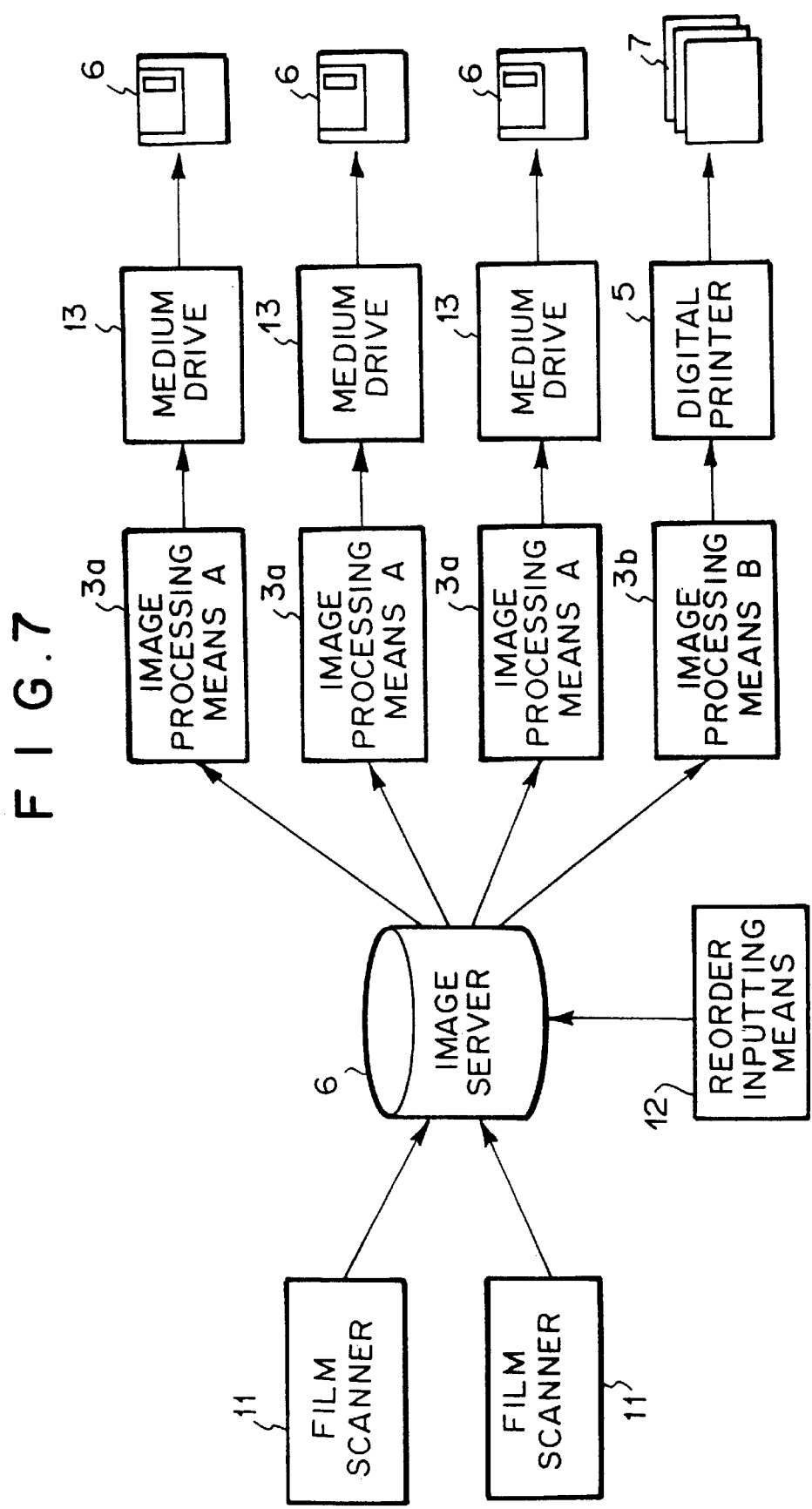
FIG. 7 is a diagram showing an embodiment of a photograph finishing system according to the present invention.

Still another embodiment wherein the above system is changed into a more efficient system will be explained hereinafter. FIG. 7 shows a second embodiment of the present invention. The performance ratio of each apparatus used in this embodiment is 3:2:6 for a film scanner, a medium drive, and a digital printer respectively in this order. Therefore, in the system shown in FIG. 7, by making the ratio of the number of each apparatus 2:3:1 for the film scanner, the medium drive, and the digital printer respectively in this order, the processing times for reading, file outputting, and printing become almost the same.

Two film scanners 11 operate at the same time, and therefore, this system deals with two films at once. The picture image data read by each film scanner 11 are sequentially stored in the image server 6 which is a server computer with a large capacity disc.

In this case, the image server 6 stores the picture image data transferred from the two scanners 11 in separate memory areas, because it is preferable to store the picture image data read from the same film in the same recording medium 6 when they are output as files so that it can be distinguished on which film each picture image data were stored when they are output.

Meanwhile, in parallel to such processing by the film scanners, the output processing by a file outputting system and a print outputting system is carried out. The file outputting system comprises the image processing means 3 and the medium drive 13, while the print outputting system comprises the image processing means 3 and the digital printer 5. The image processing means 3 carries out, for example, the color or tone correction, or compression processing when a file is output. The medium drive 13 means a floppy disc drive when the recording medium 6 is a floppy disc, and an MO disc drive when the recording medium 6 is an MO disc, for example.

The image server 6 assigns one of the output processing systems to a unit of each recording area described above, that is, to each film. As for file output, the above three processing systems process it in parallel, while print output is carried out sequentially or alternately by each recording area by the output processing systems. In this case, it is preferable to print the film number or the like on the back of a print for example, so that it is distinguishable to which film the output print belongs. Likewise, it is preferable to add an identification mark corresponding to a film to the recording medium 6.

When the processing of two films is ordered at once, it is preferable to carry out the processing such as file output at each order, not by each film.

In the present embodiment, the image server 6 stores all picture image data so that they can be used later. However, it may not be the image server 6 which stores the picture image data, and another device which can play the role of a buffer to fill the processing time gap between the film scanner 11 and the output processing system may be used. In other words, it is not necessary to store all picture image data, and a memory which temporarily stores them will be sufficient.

However, some photograph finishing systems store the data in an image server. In such a case, the image server is used as the recording means and it is preferable that all picture image data recorded by customers are stored in the image server 6 as described in the above embodiment and the output processing is carried out later by an extra print order or the like from reorder inputting means 12.

Figure 8:
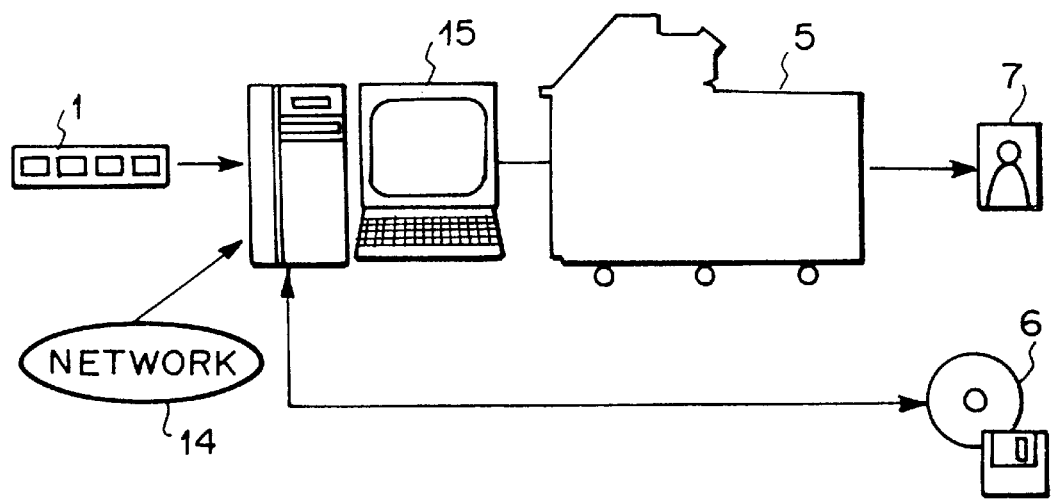
FIG. 8 is a diagram showing another embodiment of a photograph finishing system according to the present invention.

A third embodiment of the present invention will be described hereinafter. FIG. 8 shows an outline of a photograph finishing system in the present embodiment. As shown by FIG. 8, this system comprises image handling means 15 and the printer 5 which is connected to the image handling means.

In the present embodiment, the image handling apparatus 15 is a general purpose personal computer with dedicated software installed therein. As peripheral equipment thereof, a film scanner for reading a developed film is installed. Furthermore, the image handling apparatus 15 comprises a built-in or external medium drive such as a CD-R disc drive or a Zip disc drive. The image handling apparatus 15 also comprises communication equipment (not shown in FIG. 8) for exchanging image data with other computers via a network.

The picture printer 5 is a known digital picture printer. The picture printer receives image data and output instructing information (for example, the number of pictures and the size) from the image handling apparatus 15, and carries out the printing based on the received data and information.

In the above system, the image handling apparatus 15 carries out predetermined image processing on image data obtained from the developed film 1 and then transfers the image data to the picture printer 5 while recording them on the recording medium 6 such as a CD-R. The image handling apparatus 15 can receive not only the picture image input by a scanner for a print but also a picture image input by a medium. The medium may be the recording medium 6 on which the image data are recorded by the system, or another medium.

The picture image read from the medium are interruptively input to the image handling apparatus 15 when a film to be processed temporarily runs out of due to a development queue or the like, for example, and output by the printer 5.

The configuration of this system will be explained in detail referring to FIG. 9. However, among the configuration elements shown in FIG. 9, the function regarding the image processing may be implemented as the function of the above image handling apparatus 15 or as the function of the picture printer 5 or the film scanner 11. Therefore, hereinafter, explanation will be given regarding FIG. 9, without correlating FIG. 9 with FIG. 8.

Figure 9:
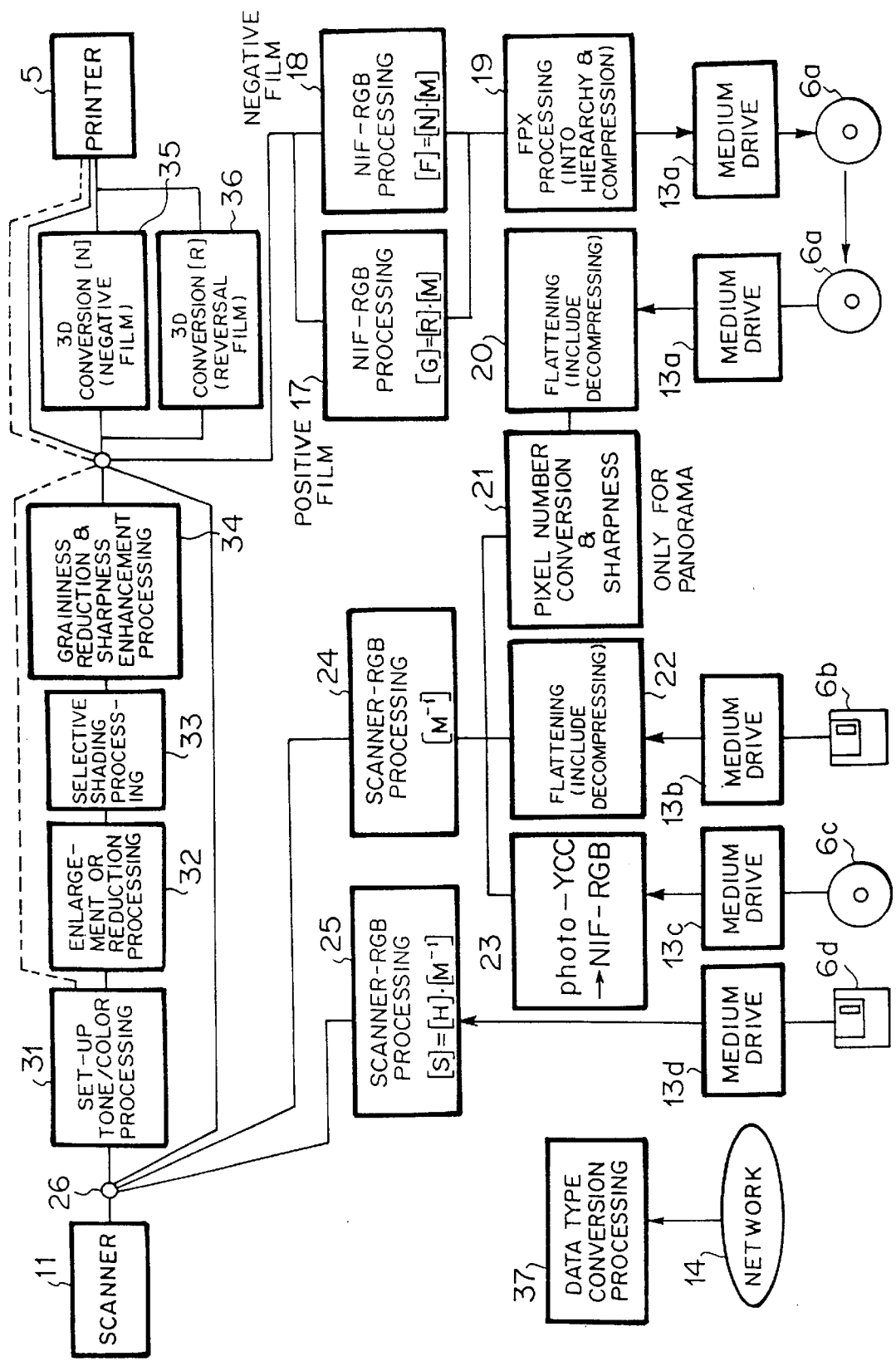
FIG. 9 is a diagram showing a configuration of the system shown in FIG. 8.

As shown in FIG. 9, the picture image obtained by the scanner 11 is processed by image processing means 31~36, and output as a picture print by the printer 5.

Set-up color/tone processing means 31 automatically judges underexposure or overexposure of a picture image and corrects the exposure to an appropriate value. Enlargement or reduction means 32 is means to carry out the pixel density conversion in accordance with the width of a print (the width of rolled paper). Selective shading processing means 33 is means to carry out shading processing such as that described in U.S. Ser. No. 08/672,939. Graininess reduction and sharpness enhancement processing means 34 is means to carry out graininess reduction and sharpness enhancement processing such as that described in EP 726672 A2.

In addition to the above series of image processing steps operations, 3D conversion processing means 35 and 36 carry out the color conversions in accordance with the characteristics of the printer used for image data printing. The 3D conversion processing varies depending on whether the film having been read is a negative film or a reversal film. Hereinafter, in this specification, the conversion processing for a negative film is called [N] conversion, while the conversion processing for a reversal film is called [R] conversion.

Meanwhile, the picture image data for output to the medium are processed by the graininess reduction and sharpness enhancement processing means 34, and then color-converted into NIF-RGB space defined by the FlashPix standard proposed by Eastman Kodak Co. by NIF-RGB processing means 17 and 18. NIF-RGB is the color reference of image data displayed on a CRT. The NIF-RGB processing is the color conversion processing on the image data to be output to the medium in order to have the most pleasing appearance when the image data are displayed on a CRT.

Furthermore, the image data are processed into a hierarchy by FPX converting means 19 so that the data are in the format defined by the FlashPix standard. The image data are then recorded in a medium 6a such as a CD-R by the medium drive 13 after compression, and provided to a customer.

Print output and medium output processing of a picture image read from a film have been described above. Hereinafter, reorder processing of the picture image recorded as described above or by another medium will be explained.

To output a picture image recorded in a medium, a drive device for reading the medium and means for interpreting the format of the image data recorded in the medium and for carrying out optimal image processing on the image data in order to obtain a high quality picture are necessary. The drive device and the means are necessary for each kind of medium and for each kind of image data format. In the present embodiment, 5 kinds of digital input can be received. However, the kinds of medium and the image format are not necessarily limited to those 5 kinds.

A first case deals with the case where the medium 6a having been provided to a customer by a service provider is brought in as it is to the service provider for a reprint. In this case, as shown in FIG. 9, flattening processing (including decompressing processing) is carried out by flattening means 20 on the image data obtained from the medium 6a. By this processing, a data structure having been changed into a hierarchy by the FPX conversion upon the output to the medium is changed into a raster (flat) data structure, and compressed data are decompressed to the original size.

In the present embodiment, after the above flattening processing, pixel density conversion processing and sharpness processing 21 is carried out, if the size of the picture image is a panoramic view. However, this processing may not necessarily be carried out at this stage, and it can be carried out immediately before the printing of the image.

Another case is the case where a customer inputs the image data having been stored in the recording medium 6a to a personal computer and re-stores the image data in another medium 6b (a Zip disc, a floppy disc, an MO disc or the like), which is often carried out when a customer asks for a processed picture image to be output in the form of a print, such as generation of a new year greeting card. In this case, since the image data format is the same as in the medium 6a, the flattening processing is carried out by flattening processing means 22 in the same manner as for the medium 6a.

As a standard other than the FlashPix, a photo CD has been widely used. The colors of image data recorded in a photo CD 6c are defined in the color space called photo-YCC. In the system of the present embodiment, the colors are converted to the NIF-RGB space by NIF-RGB processing means 23.

The image data obtained from the media 6a, 6b, and 6c as described above are all color-converted in accordance with a display on a CRT when they are output. Therefore, scanner RGB processing means 24 then carries out conversion processing on these data so that the image data have the colors and tones appropriate for output by the printer. As shown by $[M^{-1}]$ in FIG. 9, this processing is equivalent to the inversion of [M] processing when the processing carried out by the NIF-RGB processing means 17 is expressed as [G]=[R] [M], and the processing carried out by the NIF-RGB processing means 18 is expressed as [F]=[N] [M]. The image data which have been [G]-converted before the $[M^{-1}]$ processing is carried out will be in such a state after the $[M^{-1}]$ processing that the image data appears as if only [R] conversion were carried out thereon. Likewise, by carrying out the $[M^{-1}]$ processing on the image data which have already been [F]-converted, the image data will be in such a state that the image data appear as if only [N]-conversion were carried out thereon. Instead of the $[M^{-1}]$ conversion, the [G⁻¹] or [F⁻¹] conversion may be carried out and the [N] or [R] conversion will be carried out again immediately before the output of the image data as a print. However, in the present embodiment, to reduce the number of conversion processing steps and make the processing more efficient, only the [M⁻¹] processing is carried out.

As another standard of a medium and image data which have already been in wide use like the photo CD 6c, the IS standard has been proposed by Fuji Photo Film Co. Ltd. In the present embodiment, a reprint can be generated by obtaining the image data from a medium 6d produced according to this standard. Furthermore, image data transferred from a customer's personal computer via a network 14 can be taken in and reprinted by this system. However, in the case where image data are obtained via the network, it is necessary to include the information showing whether the image data are FlashPix data, photo CD data, or data in another standard, in the header information when the data are transferred, for example. Data type conversion processing means 37 in FIG. 9 is the means for judging the data type and for carrying out necessary conversion processing.

The image data which have been obtained as described above and on which appropriate conversion processing has been carried out are input interruptively by interrupting means 26 when input from the scanner is discontinued, for example. The interruption may be carried out by an operator's instruction. Alternatively, the interruption may be carried out automatically by detecting the medium being set in a medium drive, when the digital input has priority.

The image data input interruptively are the data which have already been processed when recorded in the medium after being read from a film. Therefore, it is not necessarily indispensable to carry out the processing by the image processing means 31~36. However, when an enlarged print is generated, enlargement processing should be carried out by the enlargement or reduction processing means 32, and moreover, if the picture image becomes blurred after the enlargement processing, the sharpness processing may be carried out by the graininess reduction and sharpness enhancement processing means 34. As described above, in the present embodiment, since image data have been [M⁻¹]-processed by the scanner RGB processing means, a 3D conversion processing is not necessary. The image data thus processed are output as a picture print by the printer 5.

The example described above uses the case where the image data read from a medium are converted and output. In the example which will be explained hereinafter, high resolution image data on which suitable processing for print output has been carried out are stored separately and a picture print is generated by using the high resolution image data instead of the image data read from a medium.

In this example, when a developed film is read for the first time (at the time of a first print, for example), the digital image data having been read are stored in the hard disc of the server computer of a service provider (includes a hard disc connected via a network) and also in a medium which will be provided to a customer. The hard disc has the high resolution image data which are ready to be used for a print as they are, while the medium has the image data whose resolution is reduced to such a degree that it does not cause a problem when the image is displayed on a CRT. The image data stored in both the hard disc and the medium have the identical ID.

When a reprint from the medium is ordered, the system obtains the ID of the image data by reading the low resolution image data from the medium and obtains the high resolution image data by searching the hard disc for the high resolution image data with the same ID. The system then outputs the print using the high resolution image data.

When a reprint of processed image data is carried out, information regarding the processing is recorded in the medium together with the low resolution image data, and the print is output after the processing is carried out on the high resolution image data obtained separately from the low resolution image data, based on the information.

Figure 10:
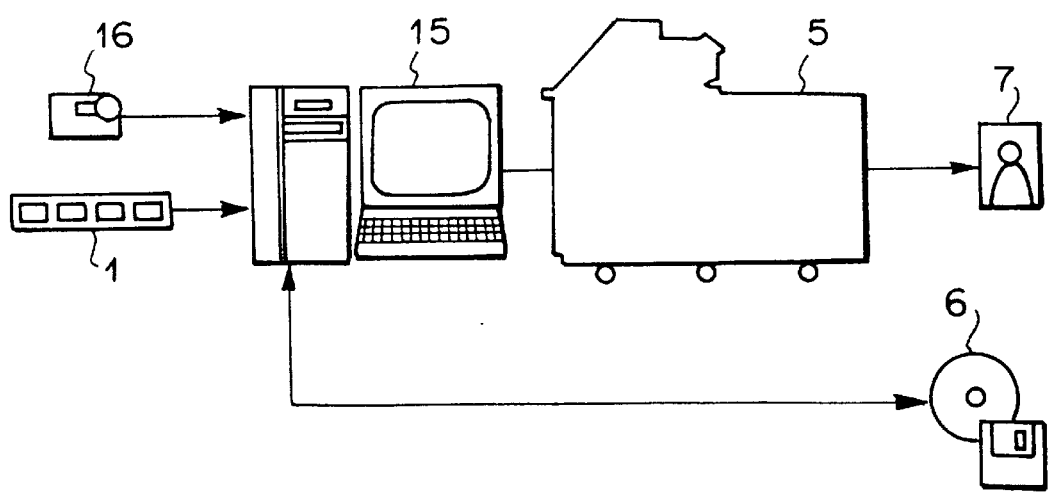
FIG. 10 is a diagram showing still another embodiment of a photograph finishing system according to the present invention.

A fourth embodiment of the present invention will be explained hereinafter. FIG. 10 shows an outline of the photograph finishing system in this embodiment. As shown by FIG. 10, this system comprises the image handling apparatus 15 and the picture printer 5 connected to the image handling apparatus 15.

In this embodiment, the image handling apparatus 15 is a general purpose personal computer with dedicated software installed therein. The image handling apparatus comprises peripheral equipment or an external interface, such as a film scanner for reading the developed film 1, a card reader for reading a memory card of a digital camera 16 or a cable interface for directly connecting the digital camera with the image handling apparatus 15. Furthermore, the image handling apparatus 15 comprises a built-in or external medium drive such as a CD-R drive or a Zip drive.

The picture printer 5 is a known digital picture printer. The picture printer receives image data and output instruction information (for example, the number of prints and the size of the prints) from the image handling apparatus 15, and outputs a print based on the received image data and information.

In the above system, the image handling apparatus 15 carries out predetermined image processing on image data obtained from the developed film 1 and then transfers the image data to the picture printer 5 while recording them on the recording medium 6 such as a CD-R. The image handling apparatus 15 can receive not only the picture image input by a scanner for a print but also a picture image input by a medium. The medium may be the recording medium 6 on which the image data are recorded by the system, or another medium.

The picture image read from the medium or input from a digital camera is interruptively input to the image handling apparatus 15 when a film to be processed temporarily runs out due to a development queue or the like, for example, and output as a print by the printer 5.

The configuration of this system will be explained in detail referring to FIG. 11. However, among the configuration elements shown in FIG. 11, the function regarding the image processing may be implemented as the function of the above image handling apparatus 15 or as the function of the picture printer 5 or the film scanner 11. Therefore, hereinafter, explanation will be given regarding FIG. 11, without correlating FIG. 11 with FIG. 10.

As shown in FIG. 11, the picture image obtained by the scanner 11 are processed by image processing means 31~36, and output as a picture print by the printer 5.

Set-up color/tone processing means 31 automatically judges underexposure or overexposure of a picture image and corrects the exposure to an appropriate value. Enlargement or reduction means 32 carries out the pixel density conversion in accordance with the width of a print (the width of rolled paper). Selective shading processing means 33 is means to carry out the shading processing such as that described in U.S. Ser. No. 08/672,939. Graininess reduction and sharpness enhancement processing means 34 carries out the graininess reduction and sharpness enhancement processing such as that described in EP 726672 A2.

In addition to the above series of image processing steps, 3D conversion processing means 35 and 36 carry out the color conversions in accordance with the characteristics of the printer on image data for a print. The 3D conversion processing varies depending on whether the film having been read is a negative film or a reversal film. Hereinafter, in this specification, the conversion processing for a negative film is called [N] conversion, while the conversion processing for a reversal film is called [R] conversion.

Meanwhile, the picture image data for output to the medium are processed by the graininess reduction and sharpness enhancement processing means 34, and then color-converted into NIF-RGB space defined by the FlashPix standard proposed by Eastman Kodak Co. by NIF-RGB processing means 17 and 18. The NIF-RGB is the color reference of image data displayed on a CRT. The NIF-RGB processing is the color conversion processing on the image data to be output to the medium in order to have the most pleasing appearance when the image data are displayed on a CRT.

Furthermore, the image data are processed in hierarchy by FPX converting means 19 so that the data are in the format defined by the FlashPix standard. The image data are then recorded in a medium 6a such as a CD-R by the medium drive 7a after compression, and provided to a customer.

Print output and medium output processing of a picture image read from a film has been described above. Hereinafter, reorder processing of the picture image recorded as described above or by another medium will be explained.

To output a picture image recorded in a medium, a drive device for reading the medium and means for interpreting the format of the image data recorded in the medium and for carrying out optimal image processing on the image data in order to obtain a high quality picture are necessary. The drive device and the means are necessary for each kind of medium and for each kind of image data format. In the present embodiment, 5 kinds of digital input can be received. However, the kinds of the medium and the image format are not necessarily limited to those 5 kinds.

A first case deals with the case where the medium 6a having been provided to a customer by a service provider is brought in as it is to the service provider for a reprint. In this case, as shown in FIG. 11, flattening processing (including decompressing processing) is carried out by flattening means 20 on the image data obtained from the medium 6a. By this processing, data structure having been changed into a hierarchy by the FPX conversion upon the output to the medium is changed into a raster (flat) data structure, and compressed data are decompressed in the original size.

In the present embodiment, after the above flattening processing, pixel density conversion processing and sharpness processing 21 is carried out, if the size of the picture image is a panoramic view. However, this processing may not necessarily be carried out at this stage, and it can be carried out immediately before the printing of the image.

Another case is the case where a customer inputs the image data having been stored in the recording medium 6a to a personal computer and re-stores the image data in another medium 6b (a Zip disc, a floppy disc, an MO disc or the like), which is often carried out when a customer asks for a processed picture image output in the form of a print, such as generation of a new year greeting card. In this case, since the image data format is the same as in the medium 6a, the flattening processing is carried out by flattening processing means 22 in the same manner as for the medium 6a.

As a standard other than the FlashPix, a photo CD has been widely used. The colors of image data recorded in a photo CD 6c are defined in the color space called photo-YCC. In the system of the present embodiment, the colors are converted to the NIF-RGB space by NIF-RGB processing means 23.

The image data obtained from the media 6a, 6b, and 6c as described above are all color-converted in accordance with a display on a CRT when they are output. Therefore, scanner RGB processing means 24 then carries out conversion processing on these data so that the image data have the colors and tones appropriate for output by the printer. As shown by $[M^{-1}]$ in FIG. 11, this processing is equivalent to the inversion of [M] processing when the processing carried out by the NIF-RGB processing means 17 is expressed as [G]=[R][M], and the processing carried out by the NIF-RGB processing means 18 is expressed as [F]=[N][M]. The image data which have been [G]-converted before the $[M^{-1}]$ processing is carried out will be in such a state after the $[M^{-1}]$ processing that the image data appears as if only [R] conversion were carried out thereon. Likewise, by carrying out the $[M^{-1}]$ processing on the image data which have already been [F]-converted, the image data will be in such a state that the image data appear as if only [N] conversion were carried out thereon. Instead of the $[M^{-1}]$ conversion, the $[G^{-1}]$ or $[F^{-1}]$ conversion may be carried out and the [N] or [R] conversion will be carried out again immediately before the output of the image data as a print. However, in the present embodiment, to reduce the number of conversion processing operations and make the processing more efficient, only the $[M^{-1}]$ processing is carried out.

As another standard of a medium and image data which have already been in wide use like the photo CD 6c, the IS standard has been proposed by Fuji Photo Film Co. Ltd. In the present embodiment, a reprint can be generated by obtaining the image data from a medium 6d produced according to this standard.

Moreover, the present system comprises a card reader 29 which reads a memory card 30 for a digital camera and obtains the recorded picture images. The obtained image data are converted by the pixel density conversion and sharpness processing means 28. The number of pixels of image data recorded by an inexpensive digital camera generally falls within the range between 350,000 to 500,000. This is approximately ¼ to ⅓ of the pixel numbers of image data obtained by reading a film. Therefore, when the image data obtained by such a digital camera are printed as they are, the print will be blurred. In the present embodiment, by carrying out the pixel density conversion, the number of pixels in the image data is 1430×1074 (approximately 1,500,000 pixels). The sharpness processing is also carried out on the image data if necessary. Furthermore, the color/tone conversion is then carried out on the digital image by the scanner RGB processing means.

As an interface for a digital camera besides the memory card, a variety of interfaces such as a cable connection interface are available.

The image data which have been obtained as described above and on which appropriate conversion processing has been carried out are interruptively input by interrupting means 26 when input from the scanner is discontinued, for example. The interruption may be carried out by an operator's instruction. Alternatively, the interruption may be carried out automatically by detecting a medium being set in the medium drive or in the card reader, when the digital input has priority.

Among the image data input by interruption, the image data obtained from a medium are the data which have already been processed when recorded in the medium after being read from a film. Therefore, it is not necessarily indispensable to carry out the processing using the image processing means 31~36. However, when an enlarged print is generated, enlargement processing should be carried out by the enlargement or reduction processing means 32, and moreover, if the picture image becomes blurred after the enlargement processing, the sharpness processing may be carried out by the graininess reduction and sharpness enhancement processing means 34. As described above, in the present embodiment, since image data have been [M⁻¹]-processed by the scanner RGB processing means, 3D conversion processing is not necessary. The image data thus processed are output as a picture print by the printer 5.

Meanwhile, among the image data input by interruption, the image data obtained from a digital camera are processed by the set-up tone/color processing means 31, because the image processing functions incorporated in the digital camera are limited in an inexpensive digital camera due to the higher cost of a digital camera than a camera using a film. In other words, to obtain a sufficient quality picture print, it is preferable to carry out a variety of set-up processing operations using the photograph finishing system. Enlargement or reduction processing may also be carried out as required, as is the case for the image data obtained from a medium.

As is obvious from the above examples, the present invention realizes a highly efficient, low cost, and space-saving system by installing, in a photograph finishing system, the function of an outputting image data read from a film in the form of a print and a file, and the function of outputting image data obtained from a medium or a digital camera in the form of a print and a file upon necessity. The present invention can thus greatly contribute to development of a digital picture service.

What is claimed is:

1. A picture image outputting method comprising the steps of:

sequentially conducting pre-scanning on a plurality of image frames recorded on a developed photographic film, using a film scanner having an automatic film feeding function, to obtain data of the pre-scanned images;

setting reading conditions for fine-scanning on the basis of the data of the pre-scanned images;

sequentially conducting fine-scanning on the plurality of image frames based on the reading conditions, using the film scanner, to obtain data of the fine-scanned images;

carrying out both image processing for print outputting and image processing for file outputting on the data of the fine-scanned images; and outputting as prints the data of the fine-scanned images on which the image processing for print output has been carried out, using a printer, and outputting, into a predetermined recording medium, as files, the data of the fine-scanned images on which the image processing for file outputting has been carried out, wherein the print outputting and the file outputting for the data of each fine-scanned image are carried out simultaneously.

2. A picture image outputting method as defined in claim 1, wherein the pre-scanning and the fine-scanning are carried out only on one or more image frames which are selected from among the plurality of image frames recorded on the developed photographic film.

3. A picture image outputting apparatus comprising:

a film scanner which automatically feeds and sequentially pre-scans a plurality of image frames recorded on a developed photographic film to obtain data of the pre-scanned images, and which sequentially fine-scans the plurality of image frames based on predetermined reading conditions to obtain data of the fine-scanned images;

means for setting reading conditions, under which the fine-scanning is to be carried out, on the basis of the data of the pre-scanned images;

image processing means for carrying out image processing for print outputting and image processing for file outputting on the data of the fine-scanned images;

a printer which outputs, as photographic prints, the data of the fine-scanned images on which the image processing for print outputting has been carried out; and a file outputting device which carries out file outputting, into a predetermined recording medium, of the data of the fine-scanned images on which the image processing for file outputting has been carried out, in a manner of a parallel operation to the printer so that the file outputting is carried out while the printer outputs, as the photographic prints, the data of the fine-scanned images on which the image processing for print outputting has been carried out.

4. A picture image outputting apparatus as define in claim 3, wherein the film scanner carries out the pre-scanning and the fine-scanning only on one or more image frames which are selected from among the plurality of image frames recorded on the developed photographic film.

5. A picture image outputting apparatus as define in claim 3, wherein the print outputting and the file outputting for the data of each fine-scanned image are carried out simultaneously.

6. A picture image outputting apparatus as defined in claim 3, wherein the print outputting and the file outputting for the data of each fine-scanned image are carried out alternately.

7. A picture image outputting method comprising the steps of:

reading out a plurality of images recorded on an image recording medium to obtain a plurality of image data sets;

selecting at least one desired image data set from the plurality of image data sets based on information about each of the plurality of images as to whether or not printing is needed;

carrying out both image processing for print outputting and image processing for file outputting on the at least one selected desired image data set; and outputting, as a print, the at least one selected desired image data set on which the image processing for print outputting has been carried out, using a printer, and outputting, into a predetermined recording medium, as a file, the at least one selected desired image data set on which the image processing for file outputting has been carried out, wherein the print outputting and the file outputting for the at least one selected desired image data set are carried out simultaneously.

8. A picture image outputting apparatus comprising:

a read-out device which reads out a plurality of images recorded on an image recording medium to obtain a plurality of image data sets;

a selecting device which selects at least one desired image data set from the plurality of image data sets based on information about each of the plurality of images as to whether or not printing is needed;

image processing means for carrying out image processing for print outputting and image processing for file outputting on the at least one selected desired image data set;

a printer which outputs, as a photographic print, the at least one selected desired image data set on which the image processing for print outputting has been carried out; and a file outputting device which carries out file outputting, into a predetermined recording medium, of the at least one selected desired image data set on which the image processing for file outputting has been carried out, in a manner of a parallel operation to the printer so that the file outputting is carried out while the printer outputs, as the photographic print, the at least one selected desired image data set on which the image processing for print outputting has been carried out.

9. A picture image outputting apparatus as defined in claim 8, wherein the print outputting and the file outputting for the at least one selected desired image data set are carried out simultaneously.

10. A picture image outputting apparatus as defined in claim 8, wherein the print outputting and the file outputting for the at least one selected desired image data set are carried out alternately.

11. A picture image outputting method comprising the steps of:

reading out a plurality of images recorded on an image recording medium to obtain a plurality of image data sets;

determining image processing conditions under which image processing for print outputting is to be carried out and image processing conditions under which image processing for file outputting is to be carried out for each image data set;

carrying out the image processing for file outputting on the plurality of image data sets under the corresponding image processing conditions; and outputting, into a predetermined recording medium, as a file, the plurality of image data sets on which the image processing for file outputting has been carried out, along with information representing a relationship between the image processing conditions under which the image processing for print outputting is to be carried out and the image processing conditions under which the image processing for file outputting is to be carried out.

12. A picture image outputting apparatus comprising:

a read-out device which reads out a plurality of images recorded on an image recording medium to obtain a plurality of image data sets;

means for determining image processing conditions under which image processing for print outputting is to be carried out and image processing conditions under which image processing for file outputting is to be carried out for each image data set;

image processing means for carrying out image processing for file outputting on the plurality of image data sets under the corresponding image processing conditions; and a file outputting device which outputs, into a predetermined recording medium, as a file, the plurality of image data sets on which the image processing for file outputting has been carried out, along with information representing a relationship between the image processing conditions under which the image processing for print outputting is to be carried out and the image processing conditions under which the image processing for file outputting is to be carried out.

13. A picture image outputting method comprising the steps of:

reading out a plurality of images recorded on an image recording medium to obtain a plurality of image data sets;

carrying out image processing on the plurality of image data sets;

storing, in a data storing device, the plurality of image data sets on which the image processing has been carried out while each image data set is correlated with corresponding identification information; and outputting, as a print, the plurality of image data sets on which the image processing has been carried out, along with the identification information on the print, using a printer.

14. A picture image outputting method as defined in claim 13, further comprising:

receiving a print order including given identification information; reading out, from the data storing device, a given image data set, among the plurality of image data sets, which corresponds to the given identification information; and outputting the given image data set as a print, using the printer.

15. A picture image outputting apparatus comprising:

a read-out device which reads out a plurality of images recorded on an image recording medium to obtain a plurality of image data sets;

image processing means for carrying out image processing on the plurality of image data sets;

a data storing device which stores the plurality of image data sets on which the image processing has been carried out while they are each correlated with corresponding identification information; and a printer which outputs, as photographic prints, the plurality of image data sets on which the image processing has been carried out with the corresponding identification information printed on each photographic print.

16. A picture image outputting as defined in claim 15, further comprising:

means for receiving a print order including given identification information; and a read-out device which reads out, from the data storing device, a given image data set, among the plurality of image data sets, which corresponds to the given identification information;

whereby the given image data set is output as a print, using the printer.

* * * * *